United States Patent
Zhang et al.

(10) Patent No.: US 12,098,081 B2
(45) Date of Patent: Sep. 24, 2024

(54) A-SITE HIGH-ENTROPY NANOMETER METAL OXIDE WITH HIGH CONDUCTIVITY, AND PREPARATION METHOD THEREOF

(71) Applicant: Zhejiang University, Zhejiang (CN)

(72) Inventors: Lingjie Zhang, Zhejiang (CN); Weiwei Cai, Zhejiang (CN); Ningzhong Bao, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/370,957

(22) Filed: Sep. 21, 2023

(65) Prior Publication Data

US 2024/0010515 A1 Jan. 11, 2024

Related U.S. Application Data

(60) Division of application No. 17/667,536, filed on Feb. 8, 2022, now Pat. No. 11,866,343, which is a continuation of application No. PCT/CN2021/087934, filed on Apr. 16, 2021.

(30) Foreign Application Priority Data

Jan. 28, 2021 (CN) .......................... 202110115158.3

(51) Int. Cl.
*C01G 31/00* (2006.01)
*C25B 1/50* (2021.01)
*C25B 11/081* (2021.01)
*B82Y 30/00* (2011.01)
*B82Y 40/00* (2011.01)

(52) U.S. Cl.
CPC .............. *C01G 31/006* (2013.01); *C25B 1/50* (2021.01); *C25B 11/081* (2021.01); *B82Y 30/00* (2013.01); *B82Y 40/00* (2013.01); *C01P 2004/38* (2013.01); *C01P 2004/64* (2013.01); *C01P 2006/40* (2013.01)

(58) Field of Classification Search
CPC ........ C01G 31/006; C25B 11/081; C25B 1/50
See application file for complete search history.

(56) References Cited

U.S. PATENT DOCUMENTS

2016/0201169 A1* 7/2016 Vecchio ................ C22C 29/005
420/580

* cited by examiner

*Primary Examiner* — James A Fiorito

(57) ABSTRACT

The present disclosure relates to the field of new materials, and aims at providing an A-site high-entropy nanometer metal oxide with high conductivity, and a preparation method thereof. The metal oxide has molecular formula of $Gd_{0.4}Er_{0.3}La_{0.4}Nd_{0.5}Y_{0.4})(Zr_{0.7}, Sn_{0.8}, V_{0.5})O_7$ and is a powder, and has microstructure of the metal oxide as a square nanometer sheet with a side length of 4-12 nm and a thickness of 1-3 nm. Compared with an existing high-entropy oxide, the product in the present disclosure has high conductivity, and can be well applied to a conductive alloy, an electrical contact composite material, a conductive composite material, a multifunctional bio-based composite material, a conductive/antistatic composite coating and the like.

1 Claim, No Drawings

A-SITE HIGH-ENTROPY NANOMETER METAL OXIDE WITH HIGH CONDUCTIVITY, AND PREPARATION METHOD THEREOF

CROSS-REFERENCE TO RELATED APPLICATION

The present application is a divisional application of U.S. patent application Ser. No. 17/667,536 filed on Feb. 8, 2022, which is a continuation application of PCT Application No. PCT/CN2021/087934 filed on Apr. 16, 2021, which claims the benefit of Chinese Patent Application No. 202110115158.3 filed on Jan. 28, 2021. The contents of the above-identified applications are hereby incorporated by reference in their entirety.

FIELD OF THE INVENTION

The present disclosure relates to the field of new materials, in particular to an A-site high-entropy nanometer metal oxide $(Gd_{0.4}Er_{0.3}La_{0.4}Nd_{0.5}Y_{0.4})(Zr_{0.7}, Sn_{0.8}, V_{0.5})O_7$ with high conductivity, and a preparation method thereof

BACKGROUND OF THE INVENTION

When a metal material is applied to a high-voltage switchable connector, a conductive composite material is usually prepared by adding a reinforced phase of a metal oxide in order to improve the capability of a metal base to resist arc erosion. For example, $SnO_2$ is added to an Ag base or a Cu base to prepare a conductive metal composite material having good arc erosion resistance and good fusion welding resistance. However, the addition of a metal oxide also has a defect of causing a decrease of the conductivity of the composite material due to the low conductivity of the metal oxide itself, not satisfying an application requirement in the field of conduction.

An oxide of multiple rare-earth metals theoretically has better conductivity, and the better conductivity is mainly due to two aspects: firstly, crystal structure distortion results in the presence of a great number of oxygen vacancies, such that the oxide of multiple rare-earth metals has good electrical transport performance (the resistivity can reach as low as $103\mu\Omega\cdot cm$) in a wide temperature range; and secondly, a multielement synergy effect enables the oxide of multiple rare-earth metals to have a higher state density at a Fermi level of the material, so as to have better electronic conductivity.

A high-entropy oxide is a new material, and is composed of four or five or more major heterogeneous metal elements. The introduction of various types of metal elements brings about higher conformation entropy for the material, and the increase in the conformation entropy can give the material improved performance. Introduction of a high-entropy concept into preparation of a metal oxide further improves the performance of the metal oxide. The high-entropy metal oxide contains more than five different elements, and can give the material larger structure distortion, thereby facilitating generation of oxygen vacancies. Moreover, introduction of various types of elements also facilitates improvement of the state density of the material at a Fermi surface, so as to realize better electronic conductivity.

However, an existing high-entropy oxide has low conductivity resulted from a microstructure design and a preparation method, and it is necessary to further improve the conductivity of the existing high-entropy oxide, so that the existing high-entropy oxide is adapted to using in more fields that need high conductivity, including being used for preparation of a conductive alloy, an electrical contact composite material, a conductive composite material, a multifunctional bio-based composite material, a conductive/antistatic composite coating and the like.

SUMMARY OF THE INVENTION

The technical problem to be solved by the present disclosure is to provide an A-site high-entropy nanometer metal oxide with high conductivity, and a preparation method thereof.

In order to solve the technical problem, the technical solution in the present disclosure is to provide an A-site high-entropy nanometer metal oxide with high conductivity, where the metal oxide has molecular formula of $(Gd_{0.4}Er_{0.3}La_{0.4}Nd_{0.5}Y_{0.4})(Zr_{0.7}, Sn_{0.8}, V_{0.5})O_7$; and is a powder, and has microstructure of a square nanometer sheet with a side length of 4-12 nm and a thickness of 1-3 nm.

The present disclosure further provides a preparation method for the A-site high-entropy nanometer metal oxide with high conductivity, the method including the following steps:

(1) taking $Gd(NO_3)_3$, $Er(NO_3)_3$, $La(NO_3)_3$, $Nd(NO_3)_3$, $Y(NO_3)_3$, $ZrOSO_4$, $SnCl_4$ and $NH_4VO_3$ at a molar ratio of 0.4:0.3:0.4:0.5:0.4:0.7:0.8:0.5 as a solute, and taking and uniformly mixing deionized water, absolute ethyl alcohol and tetrahydrofuran at a mass ratio of 0.3:3:0.5 to obtain a solvent; adding the solute to the solvent, where the ratio of the total mass of the solute to that of the solvent is 12.6%; and performing stirring for 5 to 15 minutes to obtain a mixed liquid I for later use;

(2) taking para-phenylene diamine, hydrogenated tallowamine, sorbitol and carbamyl ethyl acetate at a mass ratio of 1-3:0.2-0.4:7-9:0.01-0.03 as a solute, and adding the same to propyl alcohol, where the ratio of the total mass of the solute to that of the propyl alcohol is 7.5%; and performing stirring for 1-3 hours to obtain a mixed liquid II for later use;

(3) taking the mixed liquid I and the mixed liquid II at a mass ratio of 10-8:4-6; heating the mixed liquid I to 50-70° C., and dripping the mixed liquid II into the mixed liquid I under stirring and ultrasonic conditions; after the dripping is completed, heating the same to 85-95° C.; and stopping stirring and maintaining the temperature for 3-7 hours, and decreasing the temperature to room temperature to obtain a mixed liquid III;

(4) adding the mixed liquid III to an electrolytic cell with using a platinum electrode as an electrode and applying a voltage of 3-7 V to two ends of the electrode, and reacting for 13-17 minutes, to obtain a mixed liquid IV;

(5) heating the mixed liquid IV to 55-65° C. under stirring condition, and taking another mixed liquid II and dripping the same into the mixed liquid IV, where the mass ratio of the mixed liquid II to the mixed liquid IV is 1.05:1.25; and after the dripping is completed, decreasing the temperature to the room temperature under stirring condition, so as to obtain a mixed liquid V;

(6) performing shearing treatment on the mixed liquid V by using a shear mulser, so as to obtain a mixed liquid VI;

(7) performing lyophilization treatment on the mixed liquid VI to obtain a mixture I;

(8) mixing the mixture I and absolute ethyl alcohol at a mass ratio of 1:2, uniformly stirring the same and performing solvent thermal treatment under a sealing condition and at a temperature of 210-230° C. for 18-24 hours; and cooling the reaction to the room temperature, collecting the obtained powder by centrifugation, washing the same with deionized water and absolute ethyl alcohol eight times respectively, and drying to obtain a powder I;

(9) taking the powder I and ammonium persulfate at a mass ratio of 10:1, uniformly mixing and heating the same to a temperature of 165-175° C. under the sealing condition, and maintaining the temperature for 13-15 hours; and cooling the reaction to the room temperature, washing the obtained mixed powder with deionized water ten times, and drying to obtain a powder II; and

(10) placing the powder II into a crucible, heating the same to a temperature of 1500-1700° C., and maintaining the temperature for 7-9 hours; and cooling the reaction to the room temperature, to obtain an A-site high-entropy nanometer metal oxide with high conductivity.

In the steps (3) and (5) in the present disclosure, a dripping speed is controlled as one drop per second.

In the step (6) in the present disclosure, a rotation speed of the shear mulser is 20000-40000 revolutions per minute, and a shearing treatment time is 1-3 hours.

In step (10) in the present disclosure, a heating rate is 3° C. per minute.

THE DESCRIPTION OF THE INVENTION PRINCIPLE

The high entropy in the present disclosure is a scientific definition, and generally refers to a compound in which four or five or more types of elements are located at the same chemical structure site. A high-entropy material has greater structure stability. Moreover, various types of heterogeneous elements and structure distortion brought about by the high entropy can enable the material to have greater designability, and a desired material characteristic can be obtained by adjusting types of elements.

The high-entropy oxide in the present disclosure is consisted of two types of octahedrons at different positions, i.e. an A-site octahedron and a B-site octahedron, and the molecular formula of the oxide is $(Gd_{0.4}Er_{0.3}La_{0.4}Nd_{0.5}Y_{0.4})(Zr_{0.7}, Sn_{0.8}, V_{0.5})$, where the elements located at the A-site octahedron include Gd, Er, La, Nd and Y, and the elements located at the B-site include Zr, Sn and V. The high-entropy metal oxide contains more than five different elements, and can give the material larger structure distortion, thereby facilitating generation of oxygen vacancies. Moreover, the introduction of various types of elements also facilitates improvement of the state density of the material at a Fermi surface, and the introduction of elements at the A-site in the present disclosure enables d orbits between metal elements to overlap with each other to a greater extent, thus extremely expanding a state density distribution of the d orbits of the metal, thereby greatly improving the conductivity.

The present disclosure uses five types of ions of rare-earth metal element to form the A-site, and also uses three types of metal elements to occupy the B-site, so as to prepare a multi-element metal oxide system. In order to further realize uniform distribution of elements at the A-site, uniformity of initial precursor is improved by a method in which various types of processes (including fractional-precipitation reconstruction, electrochemical reconstruction and high-speed shearing reconstruction) are combined, so as to form, during high-temperature thermal treatment, a structure in which various elements at the A-site are uniformly distributed. As to the introduction of three types of metal elements at the B-site, it aims at adjusting the B-site, so as to reduce uniformity energy of elements at the A-site, thereby facilitating further uniformity of the various metal element ions at the A-site. The present invention improves the uniformity of the multi-element metal composite system, such that the system obtains a sufficient high entropy, thereby realizing the preparation of a high-entropy material.

In the present disclosure, five types of rare-earth metal elements are introduced to the A-site. Through theoretical calculation and design, the introduction of these five types of rare-earth metal elements enables the state density of the material at the Fermi level to be greatly increased, such that electrons in the system have a higher migration rate. Furthermore, due to introduction of a plurality of rare-earth metals at the A-site and three metals at the B-site, the material is formed with more structure distortion, thus bringing about higher ion conductivity. Therefore, an increase in both electron conductivity and ion conductivity brings about extremely great increase in conductivity of the material.

Compared with Existing Techniques, the Present Invention has the Following Beneficial Effects.

1. The present disclosure provides a combined-process preparation procedure, which combines fractional-precipitation reconstruction, electrochemical reconstruction and high-speed shearing reconstruction, realizing distribution uniformity and micro morphology controllability (a square nanometer sheet) of metal element ions at the A-site and the B-site. Moreover, the extremely great increase in the state density at the Fermi level and larger structure distortion brought about by multi-element uniformity, improves the electron conductivity and the ion conductivity of the material, so as to obtain a non-metal material with high conductivity. The A-site high-entropy nanometer metal oxide obtained has high conductivity.

2. Compared with an existing high-entropy oxide, the product prepared in the present disclosure has high conductivity, and can be well applied to a conductive alloy, an electrical contact composite material, a conductive composite material, a multifunctional bio-based composite material, a conductive/antistatic composite coating and the like.

DETAILED DESCRIPTION OF THE EMBODIMENTS

The present invention is described below in details in conjunction with the particular embodiments. The following embodiments facilitate those skilled in the art further understanding the present disclosure, but do not limit the present disclosure in any way. It should be noted that, for those skilled in the art, several alterations and modifications can be made without departing from the concept of the present invention, which fall within the protection scope of the present invention.

In the following embodiments, $Gd(NO_3)_3$, $Er(NO_3)_3$, $La(NO_3)_3$, $Nd(NO_3)_3$, $Y(NO_3)_3$, $ZrOSO_4$, $SnC_{14}$ and $NH_4VO_3$ are powder forms. Absolute ethyl alcohol, tetrahydrofuran, propyl alcohol, phenylenediamine, hydrogenated tallowamine, sorbitol and carbamyl ethyl acetate are commercial reagents.

Example 1

Provided is a preparation method for an A-site high-entropy nanometer metal oxide $(Gd_{0.4}Er_{0.3}La_{0.4}Nd_{0.5}Y_{0.4})$ $(Zr_{0.7}, Sn_{0.8}, V_{0.5})O_7$ with high conductivity, the method including the following steps.

(1) $Gd(NO_3)_3$, $Er(NO_3)_3$, $La(NO_3)_3$, $Nd(NO_3)_3$, $Y(NO_3)_3$, $ZrOSO_4$, $SnC_{14}$ and $NH_4VO_3$ were taken at a molar ratio of 0.4:0.3:0.4:0.5: 0.4:0.7:0.8:0.5, added to a mixed solution of deionized water/absolute ethyl alcohol/tetrahydrofuran at a mass ratio of 0.3:3:0.5, and stirred for five minutes to obtain a mixed liquid I. The ratio of the total mass of $Gd(NO_3)_3$, $Er(NO_3)_3$, $La(NO_3)_3$, $Nd(NO_3)_3$, $Y(NO_3)_3$, $ZrOSO_4$, $SnC_{14}$ and $NH_4VO_3$ to that of the mixed solution of deionized water/absolute ethyl alcohol/tetrahydrofuran (0.3:3:0.5) is 12.6%.

(2) Para-phenylene diamine, hydrogenated tallowamine, sorbitol and carbamyl ethyl acetate at a mass ratio of 1:0.2:7:0.01 were taken, added to propyl alcohol, and stirred for one hour to obtain a mixed liquid II. The ratio of the total mass of the para-phenylene diamine, the hydrogenated tallowamine, the sorbitol and the carbamyl ethyl acetate to that of the propyl alcohol is 7.5%;

(3) The mixed liquid I obtained in step (1) was heated to 50° C., and the mixed liquid II obtained in step (2) was dripped at the speed of one drop per second, into the mixed liquid I obtained in step (1) with stirring and ultrasound, and heated to the temperature of 85° C. after the dripping is completed and the temperature was maintained for three hours while stopping stirring, and the temperature was decreased to the room temperature, so as to obtain a mixed liquid III. The mass ratio of the mixed liquid I to the mixed liquid II is 10:4.

(4) The mixed liquid III was added to an electrolytic cell with using a platinum electrode as an electrode and applying a voltage of 3 V to two ends of the electrode, and reacting for 13 minutes, to obtain a mixed liquid IV.

(5) The mixed liquid IV obtained in step (4) was heated with stirring, another mixed liquid II was taken and dripped into the mixed liquid IV obtained in step (4) at the speed of one drop per second. The mass ratio of the mixed liquid II to the mixed liquid IV is 1.05:1.25; and after the dripping is completed, the temperature was decreased to the room temperature under stirring, so as to obtain a mixed liquid V.

(6) A high-speed shearing treatment was performed on the mixed liquid V obtained in step (5) by using a high-speed shear mulser at the speed of 20000 revolutions per minute for one hour, so as to obtain a mixed liquid VI.

(7) Lyophilization treatment was performed on the mixed liquid VI to obtain a mixture I;

(8) The mixture I obtained in step (7) and absolute ethyl alcohol were mixed at a mass ratio of 1:2 and uniformly stirred, and were sealed at a temperature of 210° C. for performing solvent thermal treatment for 18 hours. The reaction was cooled to the room temperature, the obtained powder was collected by centrifugation, washed with deionized water and absolute ethyl alcohol eight times respectively, and dried to obtain a powder I.

(9) The powder I obtained in step (8) and ammonium persulfate was uniformly mixed at a mass ratio of 10:1, and sealed and heated to 165° C. The temperature was maintained for 13 hours. The reaction was cooled to the room temperature, the obtained mixed powder was washed with deionized water ten times, and dried to obtain a powder II.

(10) The powder II obtained in step (4) was placed into a crucible, heated to a temperature of 1500° C. at a speed of 3° C. per minute. The temperature was maintained for 7 hours. The reaction was cooled to the room temperature, to obtain an A-site high-entropy nanometer metal oxide $(Gd_{0.4}Er_{0.3}La_{0.4}Nd_{0.5}Y_{0.4})(Zr_{0.7}, Sn_{0.8}, V_{0.5})O_7$ with high conductivity.

As observed via an electron microscope, the obtained A-site high-entropy nanometer metal oxide with high conductivity is a powder, and has microstructure of a square nanometer sheet with a side length of about 4 nm and a thickness of about 1 nm.

The product powder was taken and compressed by using a powder sheeter at a pressure of 550 MPa into a sheet. Conductivity of the sheet is measured by using the four-probe method, and the conductivity of the product is $2.1 \times 10^8$ S/m.

Example 2

Provided is a preparation method for an A-site high-entropy nanometer metal oxide $(Gd_{0.4}Er_{0.3}La_{0.4}Nd_{0.5}Y_{0.4})(Zr_{0.7}, Sn_{0.8}, V_{0.5})O_7$ with high conductivity, the method including the following steps.

(1) $Gd(NO_3)_3$, $Er(NO_3)_3$, $La(NO_3)_3$, $Nd(NO_3)_3$, $Y(NO_3)_3$, $ZrOSO_4$, $SnC_{14}$ and $NH_4VO_3$ were taken at a molar ratio of 0.4:0.3:0.4:0.5:0.4:0.7:0.8:0.5, added to a mixed solution of deionized water/absolute ethyl alcohol/tetrahydrofuran at a mass ratio of 0.3:3:0.5, and stirred for ten minutes to obtain a mixed liquid I. The ratio of the total mass of $Gd(NO_3)_3$, $Er(NO_3)_3$, $La(NO_3)_3$, $Nd(NO_3)_3$, $Y(NO_3)_3$, $ZrOSO_4$, $SnC_{14}$ and $NH_4VO_3$ to that of the mixed solution of deionized water/absolute ethyl alcohol/tetrahydrofuran (0.3:3:0.5) is 12.6%.

(2) Para-phenylene diamine, hydrogenated tallowamine, sorbitol and carbamyl ethyl acetate were taken at a mass ratio of 3:0.4:9:0.03, added to propyl alcohol, and stirred for three hours to obtain a mixed liquid II. The ratio of the total mass of the para-phenylene diamine, the hydrogenated tallowamine, the sorbitol and the carbamyl ethyl acetate to that of the propyl alcohol is 7.5%.

(3) The mixed liquid I obtained in step (1) was heated to 70° C., and the mixed liquid II obtained in step (2) was dripped at the speed of one drop per second into the mixed liquid I obtained in step (1) with stirring and ultrasound, was further heated to the temperature of 95° C. after the dripping is completed. The temperature was maintained for seven hours while stopping stirring, and deceased to the room temperature, so as to obtain a mixed liquid III. The mass ratio of the mixed liquid I to the mixed liquid II is 8:6.

(4) The mixed liquid III was added to an electrolytic cell with using a platinum electrode as an electrode and applying a voltage of 5 V to two ends of the electrode, and reacting for 17 minutes, to obtain a mixed liquid IV.

(5) The mixed liquid IV obtained in step (4) was heated to 65° C. with stirring, and the mixed liquid II obtained in step (2) was dripped into the mixed liquid IV obtained in step (4) at the speed of one drop per second. The mass ratio of the mixed liquid II to the mixed liquid IV is 1.05:1.25; and after the dripping is completed, the temperature was decreased to the room temperature under stirring, so as to obtain a mixed liquid V.

(6) High-speed shearing treatment was performed on the mixed liquid V obtained in step (5) by using a high-speed shear mulser at the speed of 40000 revolutions per minute for three hours, so as to obtain a mixed liquid VI.
(7) Lyophilization treatment was performed on the mixed liquid VI to obtain a mixture I.
(8) The mixture I obtained in step (7) and absolute ethyl alcohol was mixed at a mass ratio of 1:2 and uniformly stirred, and sealed at a temperature of 230° C. for performing solvent thermal treatment for 24 hours. The reaction was cooled to the room temperature, the obtained powder was collected by centrifugation, washed with deionized water and absolute ethyl alcohol eight times respectively, and dried to obtain a powder I.
(9) The powder I obtained in step (8) and ammonium persulfate were uniformly mixed at a mass ratio of 10:1, and sealed and heated to 175° C. The temperature was maintained for 15 hours and the reaction was cooled to the room temperature, the obtained mixed powder was washed with deionized water ten times, and dried to obtain a powder II.
(10) The powder II obtained in step (4) was placed into a crucible, heated to a temperature of 1700° C. at a speed of 3° C. per minute, and the temperature was maintained for 9 hours. The reaction was cooled to the room temperature to obtain an A-site high-entropy nanometer metal oxide $(Gd_{0.4}Er_{0.3}La_{0.4}Nd_{0.5}Y_{0.4})(Zr_{0.7}, Sn_{0.8}, V_{0.5})O_7$ with high conductivity.

As observed via an electron microscope, the obtained A-site high-entropy nanometer metal oxide with high conductivity is a powder, and has microstructure of a square nanometer sheet with a side length of about 4 nm and a thickness of about 1 nm.

The product powder was taken and compressed by using a powder sheeter at a pressure of 550 MPa into a sheet. The conductivity of the sheet is measured by using the four-probe method, and the conductivity of the product is $2.1 \times 10^8$ S/m.

Example 3

Provided is a preparation method for an A-site high-entropy nanometer metal oxide $(Gd_{0.4}Er_{0.3}La_{0.4}Nd_{0.5}Y_{0.4})(Zr_{0.7}, Sn_{0.8}, V_{0.5})O_7$ with high conductivity, the method including the following steps.
(1) $Gd(NO_3)_3$, $Er(NO_3)_3$, $La(NO_3)_3$, $Nd(NO_3)_3$, $Y(NO_3)_3$, $ZrOSO_4$, $SnC_{14}$ and $NH_4VO_3$ were taken at a molar ratio of 0.4:0.3:0.4:0.5:0.4:0.7:0.8:0.5, added to a mixed solution of deionized water/absolute ethyl alcohol/tetrahydrofuran at a mass ratio of 0.3:3:0.5, and stirred for 15 minutes to obtain a mixed liquid I. The ratio of the total mass of $Gd(NO_3)_3$, $Er(NO_3)_3$, $La(NO_3)_3$, $Nd(NO_3)_3$, $Y(NO_3)_3$, $ZrOSO_4$, $SnC_{14}$ and $NH_4VO_3$ to that of the mixed solution of deionized water/absolute ethyl alcohol/tetrahydrofuran (0.3:3:0.5) is 12.6%.
(2) Para-phenylene diamine, hydrogenated tallowamine, sorbitol and carbamyl ethyl acetate were mixed at a mass ratio of 2:0.3:8:0.02, added to propyl alcohol, and stirred for two hours to obtain a mixed liquid II. The ratio of the total mass of the para-phenylene diamine, the hydrogenated tallowamine, the sorbitol and the carbamyl ethyl acetate to that of the propyl alcohol is 7.5%.
(3) The mixed liquid I obtained in step (1) was heated to 60° C., and the mixed liquid II obtained in step (2) was dripped at the speed of one drop per second into the mixed liquid I obtained in step (1) with stirring and ultrasound, and further heated to the temperature of 90° C. after the dripping is completed and stopping stirring. The temperature was maintained for five hours, and decreased to the room temperature, so as to obtain a mixed liquid III. The mass ratio of the mixed liquid I to the mixed liquid II is 9:7.
(4) The mixed liquid III was added to an electrolytic cell with using a platinum electrode as an electrode and applying a voltage of 7 V to two ends of the electrode, and reacting for 15 minutes, to obtain a mixed liquid IV.
(5) The mixed liquid IV obtained in step (4) was heated to 60° C. with stirring, and the mixed liquid II obtained in step (2) was dripped into the mixed liquid IV obtained in step (4) at a speed of one drop per second. The mass ratio of the mixed liquid II to the mixed liquid IV is 1.05:1.25; and after the dripping is completed, the temperature was decreased to the room temperature under stirring, so as to obtain a mixed liquid V.
(6) A high-speed shearing treatment was performed on the mixed liquid V obtained in step (5) by using a high-speed shear mulser at the speed of 30000 revolutions per minute for two hours, so as to obtain a mixed liquid VI.
(7) Lyophilization treatment was performed on the mixed liquid VI to obtain a mixture I.
(8) The mixture I obtained in step (7) and absolute ethyl alcohol were mixed at a mass ratio of 1:2 and uniformly stirred, and sealed at the temperature of 220° C. for performing the solvent thermal treatment for 21 hours. The reaction was cooled to the room temperature, the obtained powder was collected by centrifugation, washed with deionized water and absolute ethyl alcohol eight times respectively, and dried to obtain a powder I.
(9) The powder I obtained in step (8) and ammonium persulfate were uniformly mixed at a mass ratio of 10:1, and sealed and heated to 170° C. The temperature was maintained for 14 hours. The reaction was cooled to the room temperature, the obtained mixed powder was washed with deionized water ten times, and dried to obtain a powder II; and
(10) The powder II obtained in step (4) was placed into a crucible, heated to a temperature of 1600° C. at the speed of 3° C. per minute, and the temperature was maintained for 8 hours. The reaction was cooled to the room temperature, to obtain an A-site high-entropy nanometer metal oxide $(Gd_{0.4}Er_{0.3}La_{0.4}Nd_{0.5}Y_{0.4})(Zr_{0.7}, Sn_{0.8}, V_{0.5})O_7$ with high conductivity.

As observed via an electron microscope, the obtained A-site high-entropy nanometer metal oxide with high conductivity is a powder, and has microstructure of a square nanometer sheet with a side length of about 8 nm and a thickness of about 2 nm.

The product powder was taken and compressed by using a powder sheeter at a pressure of 550 MPa into a sheet. The conductivity of the sheet is measured by using the four-probe method, and the conductivity of the product is $4.1 \times 10^8$ S/m.

Comparative Example 1

A commercially available ITO (indium tin oxide) powder is taken and compressed by using a powder sheeter at a pressure of 550 MPa into a sheet, and the conductivity of the sheet is measured by using the four-probe method.

As measured, the conductivity of the commercially available ITO (indium tin oxide) is $1.6\times10^6$ S/m.

Comparative Example 2

A commercially available powder of a high-entropy oxide $(CoCrFeMnZn)_3O_4$ is taken and compressed by using a powder sheeter at a pressure of 550 MPa into a sheet, and the conductivity of the sheet is measured by using the four-probe method.

As measured, the conductivity of the commercially available high-entropy oxide $(CoCrFeMnZn)_3O_4$ is $1.6\times10^3$ S/m.

The particular examples in the present disclosure are described above. It should be understood that the present invention is not limited to specific embodiments described above, and various alterations or modifications may be made by those skilled in the art within the scope of the claims, not affecting essential contents in the present disclosure.

The invention claimed is:

1. A nanometer metal oxide, wherein the metal oxide has a molecular formula of $(Gd_{0.4}Er_{0.3}La_{0.4}Nd_{0.5}Y_{0.4})(Zr_{0.7}Sn_{0.8}V_{0.5})O_7$, and is a powder, and has microstructure of a square nanometer sheet with a side length of 4-12 nm and a thickness of 1-3 nm.

\* \* \* \* \*